US009329953B2

(12) United States Patent
Bodke et al.

(10) Patent No.: US 9,329,953 B2
(45) Date of Patent: *May 3, 2016

(54) REDUCING APPLICATION DOWNTIME DURING FAILOVER

(75) Inventors: Manohar R. Bodke, Hyderabad (IN); Ravikiran Moningi, Bhubaneshwar (IN); Ravi A. Shankar, Austin, TX (US); Ranganathan Vidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 794 days.

This patent is subject to a terminal disclaimer.

(21) Appl. No.: 13/483,652

(22) Filed: May 30, 2012

(65) Prior Publication Data

US 2012/0239975 A1    Sep. 20, 2012

Related U.S. Application Data

(63) Continuation of application No. 12/961,569, filed on Dec. 7, 2010.

(51) Int. Cl.
*G06F 11/00* (2006.01)
*G06F 11/20* (2006.01)

(52) U.S. Cl.
CPC .......... *G06F 11/203* (2013.01); *G06F 11/2046* (2013.01); *G06F 11/2038* (2013.01)

(58) Field of Classification Search
CPC ................ G06F 11/203; G06F 11/2046
See application file for complete search history.

(56) References Cited

U.S. PATENT DOCUMENTS

| | | | |
|---|---|---|---|
| 6,105,148 | A | 8/2000 | Chung et al. |
| 7,082,551 | B2 | 7/2006 | Lawrance et al. |
| 7,165,186 | B1 | 1/2007 | Viswanatham et al. |
| 7,478,275 | B1 | 1/2009 | Deolasee et al. |
| 7,743,381 | B1 | 6/2010 | Tran |
| 2001/0008019 | A1 | 7/2001 | Vert et al. |
| 2004/0064300 | A1 | 4/2004 | Mathiske et al. |

(Continued)

FOREIGN PATENT DOCUMENTS

JP    11025062 A    1/1999

OTHER PUBLICATIONS

"Controlling the Speed of Application Failover," http://docs.hp.com/en/B3936-90100/apcs02.html, accessed Aug. 17, 2010, 3 pages.
Chen, Peter M., et al,; Fast Cluster Failover Using Virtual Memory—Mapped Communication; abstract; pp. 373-382; ICS '99 Rhodes Greece; ACM 1999.

(Continued)

*Primary Examiner* — Michael Maskulinski
(74) *Attorney, Agent, or Firm* — Edward J. Lenart; Robert R. Williams; Kennedy Lenart Spraggins LLP

(57) ABSTRACT

Reducing application downtime during failover including identifying a critical line in the startup of an application, the critical line comprising the point in the startup of the application in which the application begins to use dependent resources; checkpointing the application at the critical line of startup; identifying a failure in the application; and restarting the application from the checkpointed application at the critical line.

5 Claims, 4 Drawing Sheets

(56) References Cited

U.S. PATENT DOCUMENTS

| | | |
|---|---|---|
| 2009/0006888 A1 | 1/2009 | Bernhard et al. |
| 2009/0282101 A1* | 11/2009 | Lim et al. ............... 709/203 |
| 2010/0094948 A1* | 4/2010 | Ganesh et al. ........... 709/212 |
| 2011/0271136 A1* | 11/2011 | Abbot et al. ............. 714/2 |
| 2012/0036346 A1* | 2/2012 | Bower et al. ............. 713/2 |
| 2012/0144232 A1* | 6/2012 | Griffith et al. ........... 714/4.12 |

OTHER PUBLICATIONS

Cheng, Fan-Tien, et al.; Application Cluster Service Scheme for Near-Zero-Downtime Services; IEEE 2005; International Conference on Robotics and Automation; pp. 4062-4067; Barcelona, Spain, Apr. 2005.

* cited by examiner

REDUCING APPLICATION DOWNTIME DURING FAILOVER

CROSS-REFERENCE TO RELATED APPLICATION

This application is a continuation application of and claims priority from U.S. patent application Ser. No. 12/961,569, filed on Dec. 7, 2010.

BACKGROUND OF THE INVENTION

1. Field of the Invention

The field of the invention is data processing, or, more specifically, methods, apparatus, and products for reducing application downtime during failover.

2. Description of Related Art

High availability for applications is very important to provide continuous service. Just a few minutes of application downtime will cause interruption for business operations which often results in a huge amount of loss for customers. High availability products deployed in clustered environments typically start an application on a secondary node when an application fails on the primary node. Stopping the application on the failed node and starting the same on another node takes a long time to bring up the application into ready to serve mode. Conventional failover techniques take too long to restart a failed application.

SUMMARY OF THE INVENTION

Reducing application downtime during failover including identifying a critical line in the startup of an application, the critical line comprising the point in the startup of the application in which the application begins to use dependent resources; checkpointing the application at the critical line of startup; identifying a failure in the application; and restarting the application from the checkpointed application at the critical line.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1A:
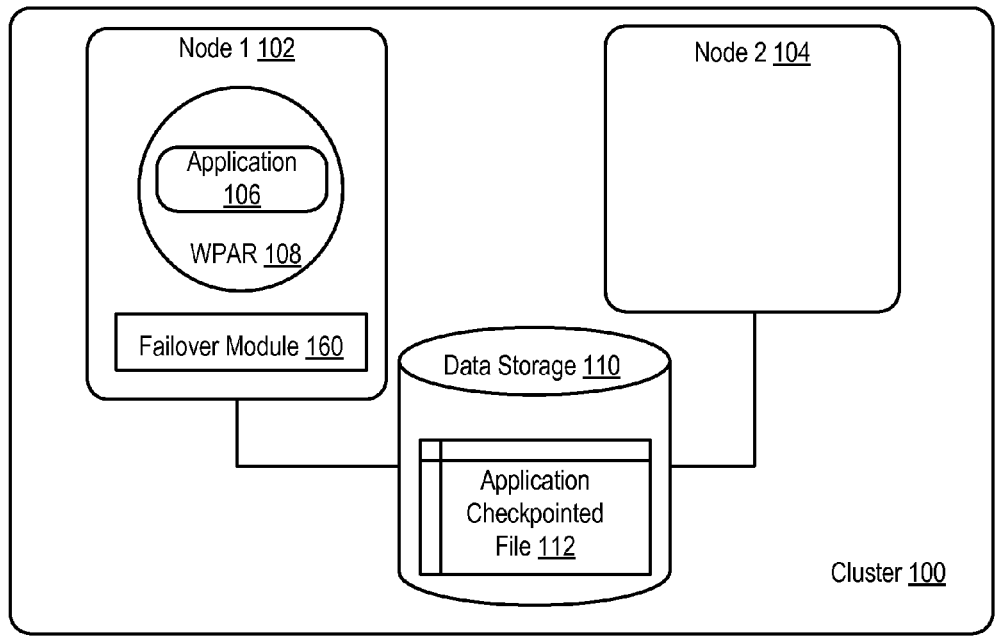
FIGS. 1A and 1B set forth block diagrams of a system for reducing application downtime during failover according to embodiments of the present invention.
Figure 1B:
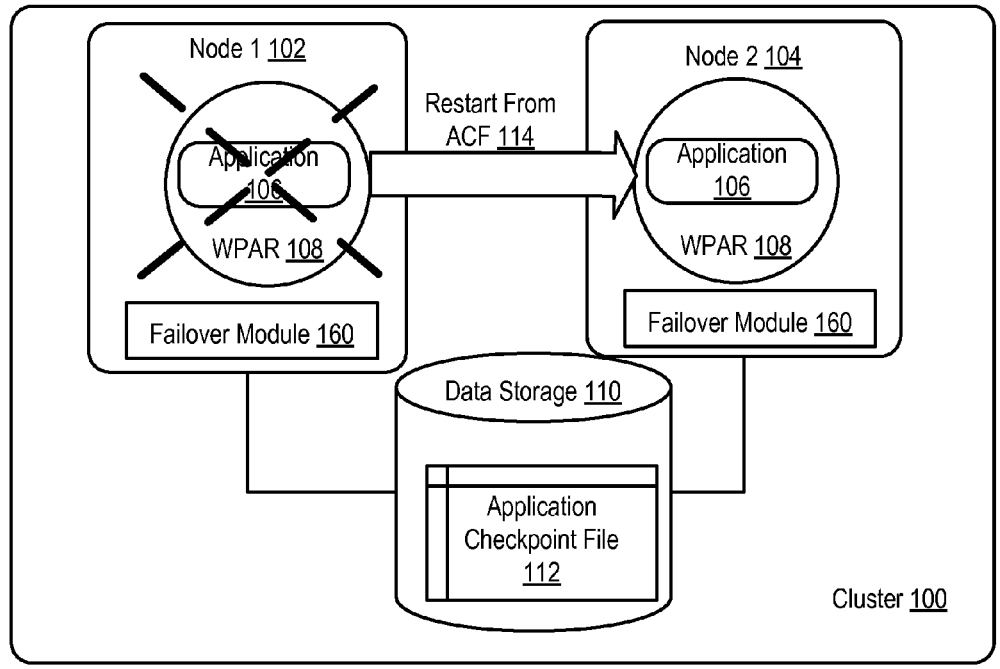

Example methods, apparatus, and products for reducing application downtime during failover in accordance with the present invention are described with reference to the accompanying drawings, beginning with FIGS. 1A and 1B. The term failover in this specification means restarting a failed application either on the same computer upon which the application failed or on another computer providing redundancy for the failed application. FIGS. 1A and 1B set forth block diagrams of a system for reducing application downtime during failover according to embodiments of the present invention. The system of FIGS. 1A and 1B include a networked cluster (100) of nodes, Node 1 (102) and Node 2 (104). A node is typically defined as any device connected to a computer network. Nodes can be computers, personal digital assistants (PDAs), cell phones, or various other network appliances. On an Internet Protocol 'IP' network, a node is typically defined as any device with an IP address.

In the example of FIG. 1A, Node 1 (102) has installed upon it a workload partition 'WPAR' (108). A WPAR is a software implementation of operating system-level virtualization technology that provides application environment isolation and resource control. WPARs are software partitions that are typically created from, and share the resources of a single instance of the operating system. System WPARS are virtual system environments that closely resembles a logical partitions 'LPARs' or a complete separate system. WPARs have their own private file systems, users and groups, login, network space, and administrative domain. Typically all WPARs share the same global AIX kernel. Application WPARs are light weight environments used for isolating and executing one or many application processes.

Deployed in the WPAR (108) in the example of FIG. 1A is an application (106). The application of FIG. 1A may be a business application upon which customers rely. To reduce the downtime of the application during failure, the system of FIGS. 1A and 1B includes a failover module (160), a module of automated computing machinery that identifies a critical line in the startup of an application. The critical line is defined as the point in the startup of the application in which the application begins to use dependent resources. Dependent resources are resources that vary during the operation of the application. Examples of such dependent resources include databases, dependent application servers, services from clients and so on as will occur to those of skill in the art. Dependent resources are distinguished from independent resources in the startup of the application in that independent resources do not vary during the operation of the application.

Figure 2:
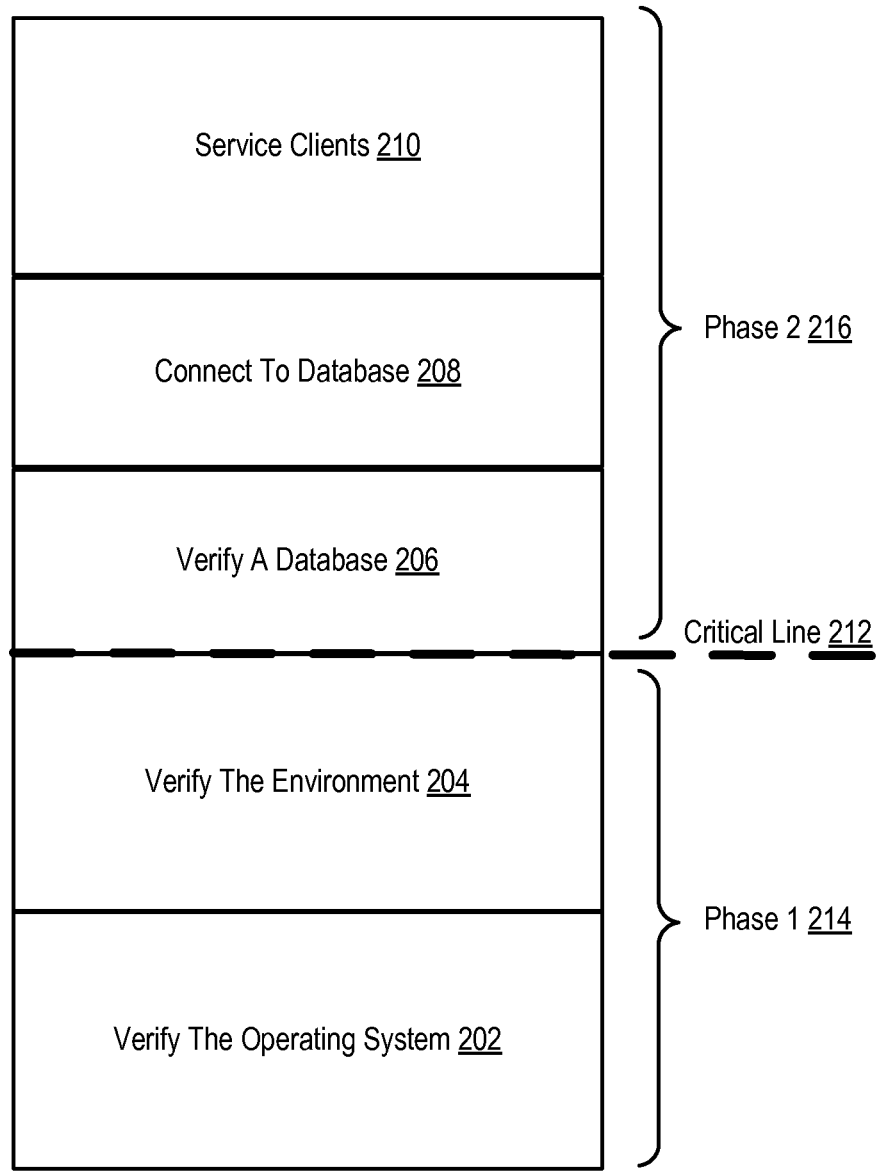
FIG. 2 sets forth a block diagram of the startup of an application.

For further explanation of a critical line in the startup of an application, FIG. 2 sets forth a block diagram of the startup of an application. The startup of the application in the example of FIG. 2 includes two phases, Phase 1 (214) and Phase 2 (216). The critical line (212) is the point the startup of the application of FIG. 2 in which Phase 1 (214) ends and Phase 2 (216) begins and the critical line (212) is the point the application startup in which the application begins to use dependent resources. In the example of FIG. 2, Phase 1 (214) includes verifying the operating system (202) and verifying the environment (204) aspects of the startup process that use independent resources. Phase 2 (216) include the use of dependent resources such as verifying the database (206), connecting to the database (208), and servicing clients (210).

Returning to the system for reducing application downtime during failover of FIGS. 1A and 1B, upon identifying a critical line in the startup of an application, the failover module of FIG. 1A checkpoints the application at the critical line of startup. Checkpointing an application is a technique for inserting fault tolerance into a computing system that is carried out by storing a snapshot of the current application state for use in restarting the execution of the application in case of failure. The failover module (160) of FIG. 1A may checkpoint the applications according to a number of different techniques in various embodiments of the present invention. Depending on the specific implementation, the different techniques a failover module may use in checkpointing the application may be classified as having several properties:

Amount of state saved: This property refers to the abstraction level used by the technique to analyze an application. Amount of state saved can range from seeing the application as a black box, hence storing all application data, to selecting specific relevant cores of data in order to achieve a more efficient and portable operation.

Atomization level: Depending on the effort needed to achieve restarting the particular application through the use of a specific checkpointing solution.

Portability: Whether or not the saved state can be used on different nodes and different machines to restart the application.

System architecture: How the checkpointing technique is implemented being.

There are a number of checkpointing tools that may be modified for use in a failover module according to embodiments of the present invention that include checkpointing packages have been developed for the Linux/Unix family of operating systems, the Cryopid checkpointing packages, DMTCP (Distributed MultiThreaded Checkpointing), the checkpointing tool in the OpenVZ kernel, and many others as will occur to those of skill in the art.

In the example of FIG. 1A, the failover module (160) stores the application checkpointed file (112) in data storage (110) available to the cluster (100). Such data storage may be located on one or more nodes of the cluster (100), or located outside the cluster as will occur to those of skill in the art.

The failover module (160) of FIG. 1A, identifies a failure in the application and restarting the application from the checkpointed application at the critical line. Restarting the application from the checkpointed application at the critical line reduces the downtime of the application because the startup of the application before the critical line is avoided.

The application may be restarted on the node previously running the application or on another node. The example of FIG. 1B illustrates the failure of the application (106) on Node 1 (102). In the example of FIG. 1B, the application is restarted (114) on Node 2 (104) from the critical line using the checkpointed application stored in the application checkpoint file (112).

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Reducing application downtime during failover in accordance with the present invention is generally implemented with computers, that is, with automated computing machinery. In the system of FIG. 1, for example, all the nodes and data storage are implemented to some extent at least as computers. For further explanation, therefore, FIG. 3 sets forth a block diagram of automated computing machinery comprising an example server (152) useful in reducing application downtime during failover according to embodiments of the present invention. The server (152) of FIG. 3 includes at least one server processor (156) or 'CPU' as well as random access memory (168) ('RAM') which is connected through a high speed memory bus (166) and bus adapter (158) to processor (156) and to other components of the server (152).

Stored in RAM (168) is an operating system (154). Operating systems useful reducing application downtime during failover according to embodiments of the present invention include UNIX™, Linux™, Microsoft XP™, AIX™, IBM's i5/OS™, and others as will occur to those of skill in the art.

Also stored in RAM (168) is a failover module (160), an automated computing machinery capable of reducing application downtime during failover that includes identifying a critical line in the startup of an application, the critical line comprising the point in the startup of the application in which the application begins to use dependent resources; checkpointing the application at the critical line of startup; identifying a failure in the application; and restarting the application from the checkpointed application at the critical line.

Figure 3:
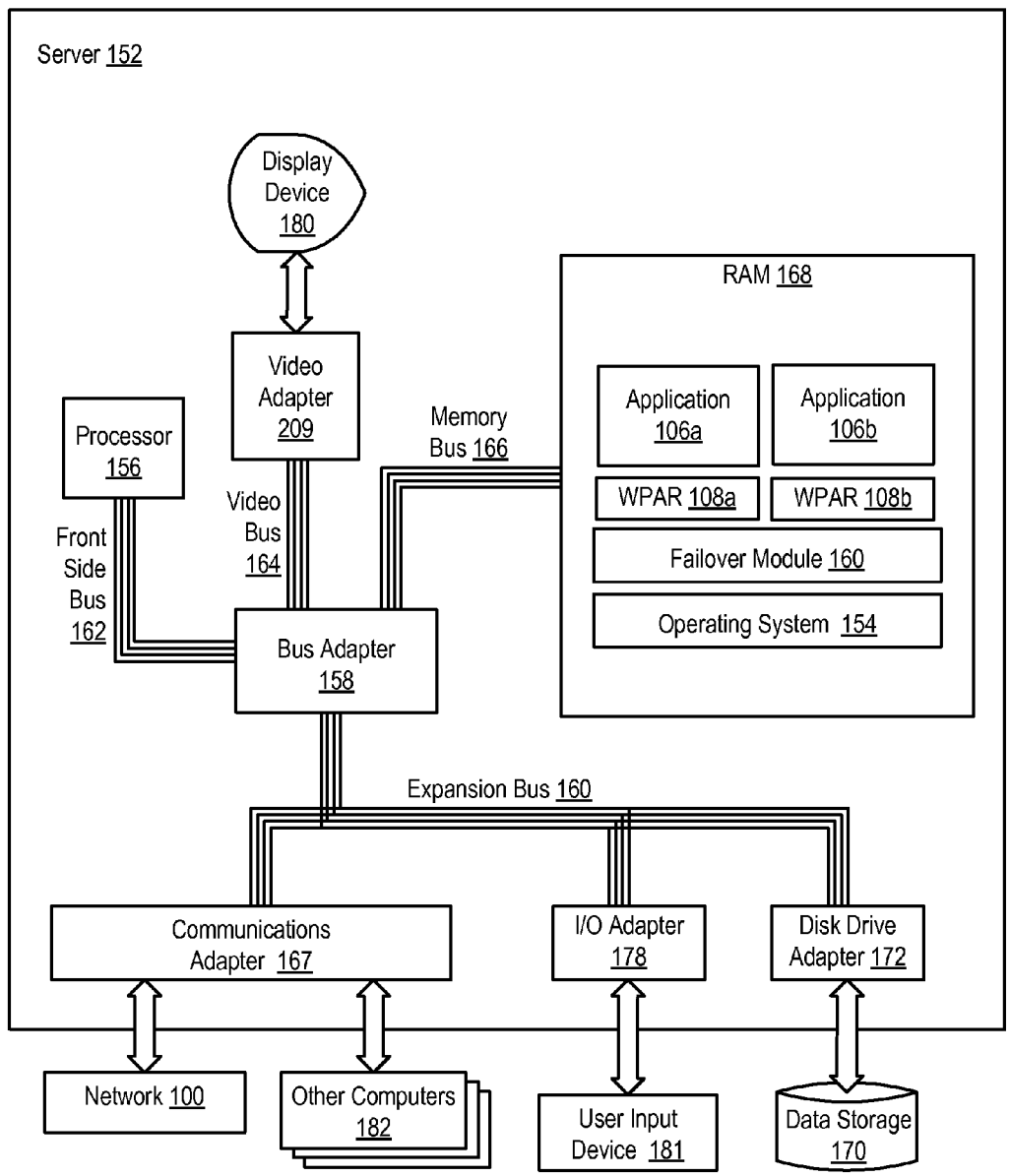
FIG. 3 sets forth a block diagram of automated computing machinery comprising an example server useful in reducing application downtime during failover according to embodiments of the present invention.

Also stored in RAM (168) in the example of FIG. 3 are two workload partitions (108a, 108b) each supporting an application (106a, 106b). Each of the applications of FIG. 3 may have their downtime reduced during failover according to embodiments of the present invention.

The server (152) of FIG. 3 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in servers for reducing application downtime during failover according to embodiments of the present invention include Integrated Drive Electronics ('IDE') adapters, Small Server System Interface ('SCSI') adapters, and others as will occur to those of skill in the art. Non-volatile server memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 3 includes one or more input/output ('I/O') adapters (178). I/O adapters implement user-oriented input/output through, for example, software drivers and server hardware for controlling output to display devices such as server display screens, as well as user input from user input devices (181) such as keyboards and mice. The example server (152) of FIG. 3 includes a video adapter (209), which is an example of an I/O adapter specially designed for graphic output to a display device (180) such as a display screen or server monitor. Video adapter (209) is connected to processor (156) through a high speed video bus (164), bus adapter (158), and the front side bus (162), which is also a high speed bus.

The example server (152) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one server sends data communications to another server, directly or through a data communications network. Examples of communications adapters useful for reducing application downtime during failover according to embodiments of the present invention include modems for wired dial-up communications, Ethernet (IEEE 802.3) adapters for wired data communications network communications, and 802.11 adapters for wireless data communications network communications.

Figure 4:
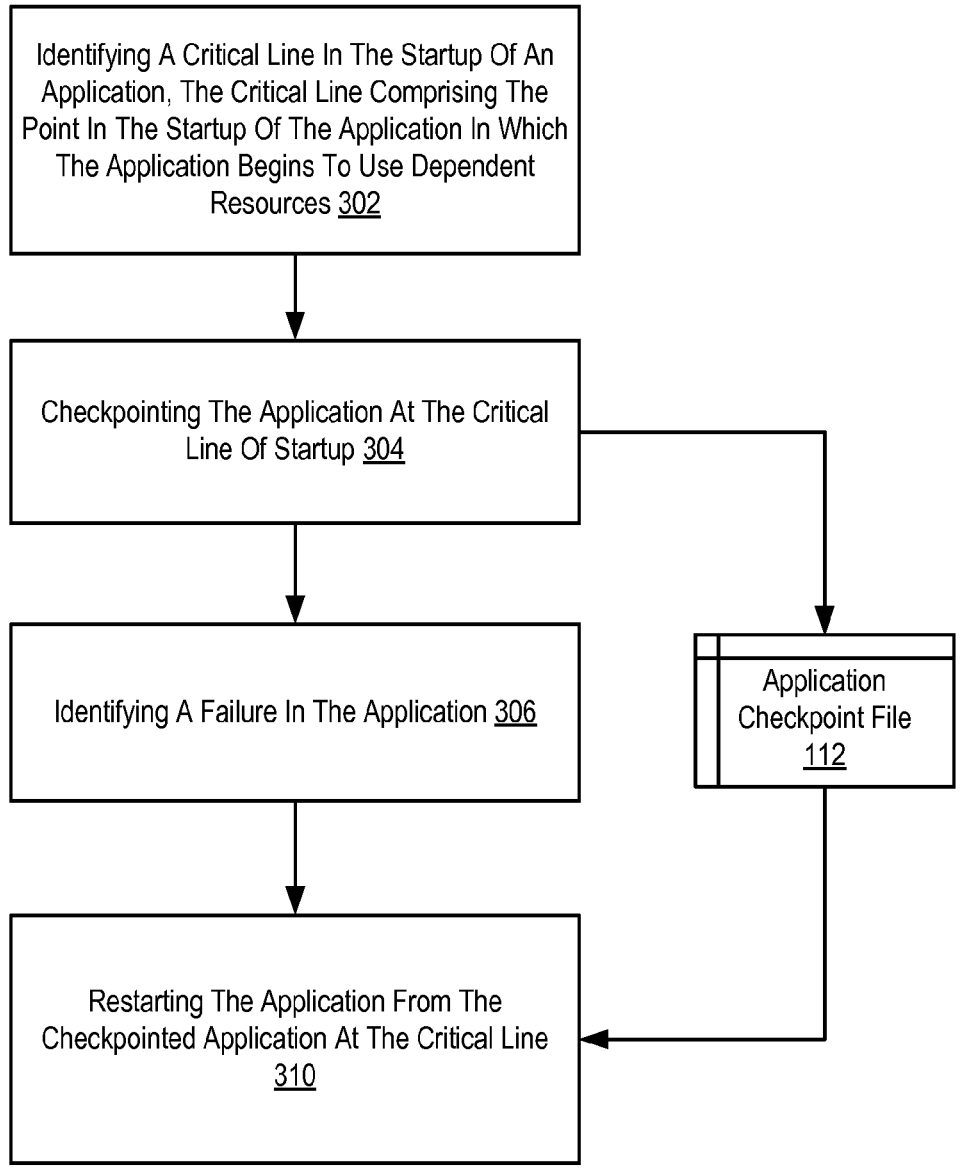
FIG. 4 sets forth a flow chart illustrating an example method for reducing application downtime during failover according to embodiments of the present invention.

For further explanation, FIG. 4 sets forth a flow chart illustrating an example method for reducing application downtime during failover according to embodiments of the present invention. The method of FIG. 4 includes identifying (302) a critical line in the startup of an application, the critical line comprising the point in the startup of the application in which the application begins to use dependent resources. Identifying (302) a critical line in the startup of an application may be carried out by monitoring the startup of the application and determining the point in the application startup at which the application begins to use dependent resources. Upon reaching the critical line, an event may be generated to inform a module checkpointing the application that the startup has reached the critical line and that the application is to be checkpointed.

In some embodiments, the critical line may be the point in startup of the application at which the startup of the workload partition has completed. In such embodiments, identifying (302) a critical line in the startup of an application may be carried out by identifying finishing the startup of the workload partition. In other embodiments, the critical line may be the point in startup of the application at which the application verifies a database. In such embodiments, identifying a critical line in the startup of an application may be carried out by identifying the point in the startup of the application in which the application verifies a database.

The method of FIG. 4 also includes checkpointing (304) the application at the critical line of startup. Checkpointing (304) the application at the critical line of startup may be carried out by storing a snapshot of the current application state for use in restarting the execution of the application The method of FIG. 4 also includes identifying (306) a failure in the application. Identifying (306) a failure in the application may be carried out by receiving error events from modules or components of the application and determining that an error that requires restarting the application has occurred.

The method of FIG. 4 also includes restarting (304) the application from the checkpointed application (112) at the critical line. Restarting (304) the application from the checkpointed application (112) at the critical line may be carried out retrieving an application checkpoint file and using the application checkpoint file to restart the application at the critical line.

As mentioned above, in some embodiments of the present invention the application may be deployed in a cluster. In some such embodiments, checkpointing (304) the application at the critical line of startup may include checkpointing the application on a first node and restarting (310) the application from the checkpointed application at the critical line may include restarting the application from the checkpointed application at the critical line on a second node.

Those of skill in the art will appreciate that restarting (304) the application from the checkpointed application (112) at the critical line reduces the downtime of the application over simply restarting the application from the beginning of the application startup. For example, if an application is deployed in a WPAR, restarting the application from the beginning of application startup may be calculated as follows:

t11: Time taken to start the WPAR
t12: Time taken to start the Application
Total time taken to start the application T1=t11+t12

If instead the application is restarted from the checkpointed application at the critical line, the application startup may be calculated as follows:

t21: Time taken to restart the WPAR from the critical line using checkpointed application
t22: Time taken for the application to complete startup after the critical line.
Total time taken to start the application T2=t21+t22

As described above, T1>T2 because t1>=t21. More particularly, t11=t21+n, where n is the time taken to startup from the beginning of application startup to the critical line. As such, n represents a reduction in downtime during application failover.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing application downtime during failover, the method comprising:
   identifying a critical line in the startup of an application, the critical line comprising the point in the startup of the application in which the application begins to use dependent resources;
   checkpointing the application at the critical line of startup;
   identifying a failure in the application; and
   restarting the application from the checkpointed application at the critical line.

2. The method of claim 1 wherein the application is deployed in a cluster and checkpointing the application at the critical line of startup further comprises
   checkpointing the application on a first node; and
   restarting the application from the checkpointed application at the critical line further comprises restarting the application from the checkpointed application at the critical line on a second node.

3. The method of claim 1 wherein the application is deployed in a workload partition.

4. The method of claim 3 wherein the critical line is a point in startup of the workload partition.

5. The method of claim 1 wherein identifying a critical line in the startup of an application further comprises identifying the point in the startup of the application in which the application verifies a database.

* * * * *